United States Patent

Ishitsuka et al.

[11] Patent Number: 5,958,105
[45] Date of Patent: Sep. 28, 1999

[54] PROCESS FOR PREPARING METALLIC BERYLLIUM PEBBLES

[75] Inventors: Etsuo Ishitsuka; Hiroshi Kawamura, both of Ibaraki; Naoki Sakamoto; Kiyotoshi Nishida, both of Nagoya, all of Japan

[73] Assignees: Japan Atomic Energy Research Institute; NGK Insulators, Ltd., both of Japan

[21] Appl. No.: 09/068,449
[22] PCT Filed: Sep. 11, 1997
[86] PCT No.: PCT/JP97/03207
§ 371 Date: Jul. 2, 1998
§ 102(e) Date: Jul. 2, 1998
[87] PCT Pub. No.: WO98/11557
PCT Pub. Date: Mar. 19, 1998

[30] Foreign Application Priority Data

Sep. 11, 1996 [JP] Japan ................................. 8-240182

[51] Int. Cl.⁶ .................................................. B22F 9/00
[52] U.S. Cl. .................. 75/336; 75/338; 75/346; 75/10.18; 75/10.23
[58] Field of Search ............................... 75/346, 336, 338, 75/10.18, 10.23

[56] References Cited

U.S. PATENT DOCUMENTS 3,784,656   1/1974   Kaufmann .

FOREIGN PATENT DOCUMENTS 61-194389   8/1986   Japan .
3-226508   10/1991   Japan .
6-228602    8/1994   Japan .
6-228673    8/1994   Japan .
6-228674    8/1994   Japan .

Primary Examiner—Ngoclan Mai
Attorney, Agent, or Firm—Parkhurst & Wendel

[57] ABSTRACT

A method for stably producing metal beryllium pebbles each ranging from 0.1 to 1.8 mm in particle diameter and 0.05 to 0.6 mm in crystal grain average diameter. The metal beryllium pebbles obtained by the invention are excellent not only in tritium emission power but also in anti-swelling property, and are thus useful as a material for nuclear fusion reactors. The metal beryllium pebbles can also be advantageously employed for aerospace structural materials and the like, by utilizing their light weight and high melting point properties.

3 Claims, 2 Drawing Sheets

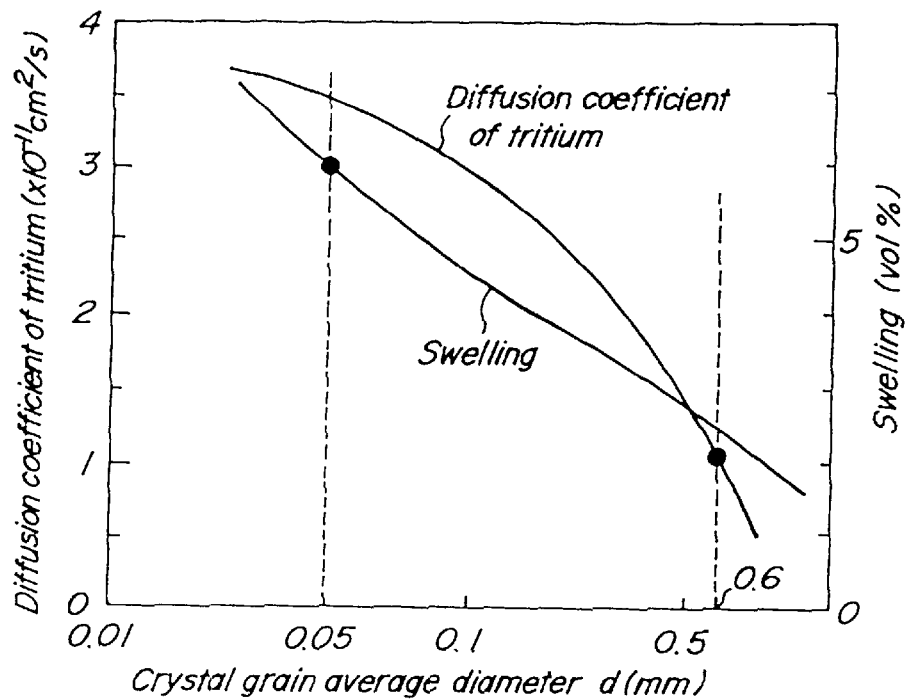
FIG_1
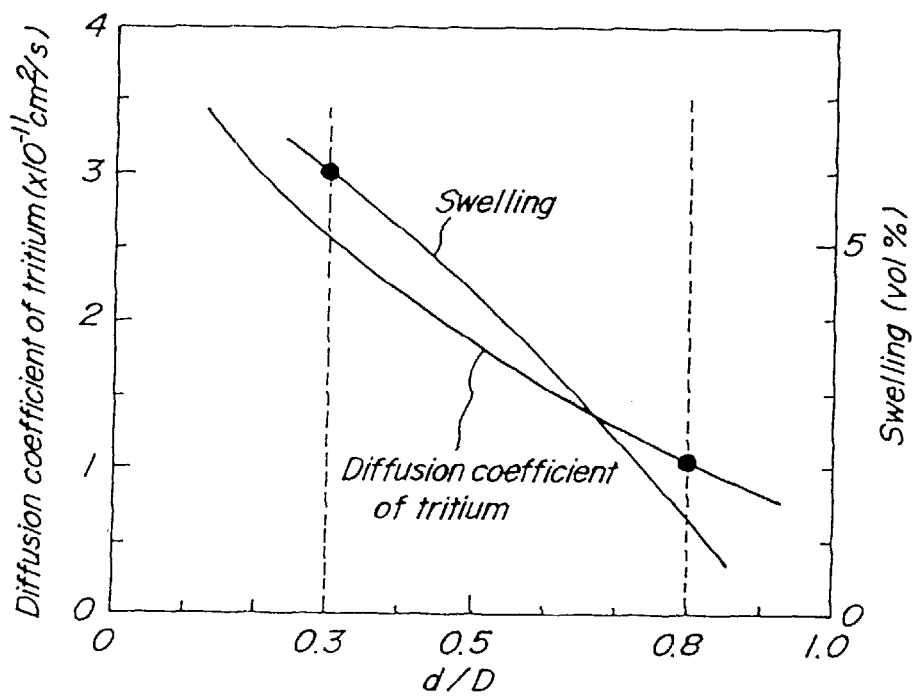
FIG_2

PROCESS FOR PREPARING METALLIC BERYLLIUM PEBBLES

TECHNICAL FIELD

The invention relates to a method of producing metal beryllium pebbles, which are excellent not only in tritium emission power and anti-swelling properties, but also in crash strength and heat transmitting properties.

The metal beryllium pebbles produced according to the invention can be advantageously employed for moderators and reflectors of neutron, not to mention to speak of neutron multiplying materials of nuclear fusion reactor blankets, and further for aerospace structural materials and the like.

BACKGROUND ART

It has been highlighted that metal beryllium pebbles (pebble-like metal beryllium) are used for a neutron multiplying material in a nuclear fusion reactor blanket.

This is due to the fact that, in the nuclear fusion reactor blanket, although formation of one tritium requires one neutron, the collision of one neutron to metal beryllium causes two neutrons to be formed; therefore, use of metal beryllium pebbles for a blanket material enables tritium to be effectively multiplied, which results in expectation of advantageous improvement in nuclear fusion reaction fuel cycle.

Also, such metal beryllium pebbles are useful for moderators and reflectors of neutron in a nuclear fusion reactor blanket.

Further, such metal beryllium pebbles are expected to be employed for aerospace structural materials and the like, by utilizing the light weight and the high melting point properties.

As a method of producing such metal beryllium pebbles, there has been known a method of reducing beryllium fluoride by magnesium (hereinafter referred to as "magnesium reducing method").

The magnesium reducing method, which was developed in the United States of America and in other countries as a method of industrially extracting metal beryllium, is to produce pebble-like metal beryllium by the use of the following reaction formula:

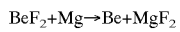

In the above-mentioned magnesium reducing method, the pebble-like metal beryllium is formed in the beryllium fluoride solution, and then floats on the liquid surface of molten beryllium fluoride by the gravity concentration. Thus obtained metal beryllium pebbles are generally not less than 5 mm in particle diameter.

Besides, the metal beryllium pebbles produced by the magnesium reducing method are intermediate products obtained when the metal beryllium is industrially extracted, each of which includes various kinds of impurity elements. In particular, it includes fluorine, magnesium and the like as volatile impurities in large amounts, which possibly causes corrosive gasses to generate. Moreover, the shape of the pebble is not spheric at all, thereby lowering the packing density in the actual device, which reduces the neutron multiplying power to be satisfactorily expected.

Accordingly, in order to solve the above-mentioned problems in the magnesium reducing method, there has been developed a method called rotational electrode process (Japanese Patent Laid-open No. 3-226508, Japanese Patent Laid-open No. 6-228674, and the like).

The rotational electrode process comprises the steps of making an arc or a plasma between a plasma dissoluble electrode and a cylindrical column-like metal beryllium consumable electrode, both of which are disposed in a closed container filled with an inert gas, to thereby melt the leading end of the consumable electrode due to the heat generated by the above arc or plasma, while splashing beryllium droplets due to the centrifugal force caused by the rotation of the consumable electrode to thereby solidify the beryllium droplets in the inert gas atmosphere, providing spherical beryllium pebbles.

The beryllium pebbles obtained by the above process have various advantages. They are not only smaller and more uniform in particle diameter but they are also higher in purity and in sphericity, while being smoother in surface roughness, compared with those obtained by the magnesium reducing method.

Such metal beryllium pebbles effectively function as the neutron multiplying member, as described above; however, radiation of neutrons to the metal beryllium causes helium to generate and then condense in the crystal, which results in a volume expansion called "swelling".

Such a volume expansion causes the metal beryllium pebbles to be cracked or broken, which often lowers the resistance against external stress, thermal conductivity and the like.

The beryllium pebbles obtained by the above-mentioned rotational electrode process are excellent in anti-swelling property when compared with those obtained by the magnesium reducing method.

To solve the above-mentioned problems, the inventors have developed a technology for preventing a volume expansion of the pebbles by storing helium in a vacancy disposed in the metal beryllium pebbles, as disclosed in Japanese Patent Laid-open No. 6-228673.

The above-mentioned technology effectively prevents occurrence of the swelling; however, the tritium generated in the beryllium also is stored in the vacancy of the pebble, which thus necessarily lowers the tritium emission amount.

On the other hand, there has recently become a target to reduce the storage amount of the tritium occurring in the beryllium, to improve the tritium emission power.

Besides, the metal beryllium pebbles are expected to be employed for aerospace structural materials and the like, by utilizing their light weight and their high melting point properties. Such use requires high crash strength and excellent heat transmitting properties. However, conventional metal beryllium pebbles do not have satisfactory characteristic values for use in aerospace structural materials.

DISCLOSURE OF THE INVENTION

The invention serves to cope with the above requirements. It is therefore an object of the invention to provide a method useful for producing metal beryllium pebbles, which are capable of not only preventing occurrence of swelling, but effectively improve tritium emission power, and which are excellent in crash strength and heat transmitting properties.

The details of the development which resulted in the invention will be described hereinbelow.

The inventors conducted thorough investigations relating to the tritium emitting mechanism and the swelling occurring mechanism in the metal beryllium pebbles, and arrived at novel recognition as explained below.

That is, the tritium occurs in the metal beryllium pebbles due to irradiation of neutrons. Emission of tritium from the surface of the metal beryllium pebbles requires to move them from the inside of the crystal grain to the surface of the pebbles due to diffusion. The diffusion generally progresses more smoothly in the crystal grain boundary than in the crystal grain itself; therefore, in order to improve the tritium emission power, it would be highly effective to increase the amount of the crystal grain boundary, that is, to decrease the crystal grain diameter.

The crystal grain average diameter of the metal beryllium pebbles produced by the rotational electrode process under the condition depending on the normal method is usually about 0.6 to 0.8 mm. Therefore, a further decrease of the crystal grain diameter and a further increase of the amount of the crystal grain boundary would result in improvement in the tritium emission power.

On the other hand, the crystal grain boundary acts as the starting point to which the helium generated due to the neutron irradiation are collected in the form of bubbles; therefore, an increase in the amount of the crystal grain boundary possibly causes the swelling to increase. As a result, a decrease in the crystal grain diameter would not be preferable from the view point of the anti-swelling property.

Also, it has been identified by the inventors that the swelling occurs with impurities, particularly, iron-based inclusions ($Be_{11}Fe$, and the like) in the pebbles, as the starting points.

Therefore, the inventors obtained, as a result of the investigations for the purpose of solving the above-mentioned ambivalent problems, the recognition that restricting not only the particle diameter and the crystal grain average diameter of the metal beryllium pebble, but also impurities, particularly Fe contents within a specified range advantageously causes the tritium emission power to be effectively improved without occurrence of the swelling.

In other word, the above investigations revealed that if the metal beryllium pebbles were controlled to range from 0.1 to 1.8 mm in particle diameter and from 0.05 to 0.6 mm in crystal grain average diameter, the tritium emission power could be effectively improved without occurrence of the swelling, and further the crash strength and the heat transmitting properties could be improved.

Therefore, the inventors continued investigations to seek for a method of stably producing the metal beryllium pebbles in which the particle diameter and the crystal grain average diameter fall within the above-mentioned ranges, respectively.

As a result, the metal beryllium pebbles each having, a desired structure can be obtained by restricting the production conditions within specified ranges, in the rotation electrode process.

Furthermore, although the above-mentioned production conditions were rather severe, it was found that inclusion of a very small amount of Fe into the beryllium material as a raw material causes such production conditions to be considerably relaxed.

That is, the inventors have obtained the following recognition:

(1) As described above, Fe forms the iron-based inclusions ($Be_{11}Fe$, and the like) when it is included into the pebble in large amounts, thereby causing helium atoms to be collected with the iron-based inclusions as the starting points, which causes occurrence of the swelling to be accelerated. This, however, can be prevented if the of Fe contents are controlled to be not more than 0.04 wt %.

(2) Also, the iron-based inclusions effectively act as crystalline nuclei when the metal beryllium pebbles are produced; therefore, utilization of the action of such Fe-based inclusions enables the crystal grains to be effectively fined, which causes the production conditions to be relaxed.

The invention takes its ground on the above-mentioned recognition.

According to a first aspect of the present invention, there is provided a method of producing metal beryllium pebbles by making an arc between a plasma dissoluble electrode and a cylindrical column-like metal beryllium consumable electrode, both of which being disposed in a closed container filled with an inert gas as an atmosphere, while rotating said consumable electrode to thereby melt said consumable electrode and splashing droplets due to the centrifugal force, wherein the method is carried out under conditions of a gas pressure of atmosphere in said closed container: 5300 to 11500 Torr, an arc current: 100 to 200 A, and a rotational peripheral velocity of said consumable electrode: 4 to 1000 m/s, thereby providing metal beryllium pebbles ranging from 0.1 to 1.8 mm in particle diameter and 0.05 to 0.6 mm in crystal grain average diameter.

According to a second aspect of the present invention, there is provided a method of producing metal beryllium pebbles by making an arc between a plasma dissoluble electrode and a cylindrical column-like metal beryllium consumable electrode, both of which being disposed in a closed container filled with an inert gas as an atmosphere, while rotating said consumable electrode to thereby melt said consumable electrode and splashing droplets due to the centrifugal force, wherein said metal beryllium consumable electrode has an Fe content of 0.01 to 0.04 wt %, and wherein the method is carried out under conditions of a gas pressure of atmosphere in said closed container: 2300 to 11500 Torr, an arc current: 100 to 250 A, and a rotational peripheral velocity of the consumable electrode: 4 to 1000 m/s, thereby providing metal beryllium pebbles range from 0.1 to 1.8 mm in the diameter of crystal grain 0.05 to 0.6 mm in the average diameter of crystal grains.

In the first and the second aspects of the invention which are mentioned above, it is preferable that the relationship $0.3D \leq d \leq 0.8D$ is satisfied, where the particle diameter of the metal beryllium pebbles is represented by D (mm), and the crystal grain average diameter by d (mm).

The invention will be described in detail hereinbelow.

First, the reason why the above-mentioned ranges have been determined for the crystal grain average diameter (d) and the particle diameter (D) of the metal beryllium pebble the diameter ratio d/D will be described below.

Crystal grain average diameter: 0.05 to 0.6 mm

When the crystal grain average diameter of the metal beryllium pebbles is less than 0.05 mm, the crystal grain boundary is so large in quantity that occurrence of the swelling cannot be completely prevented, whereas when more than 0.6 mm, the crystal grain boundary is so small in quantity that the effective emission of tritium cannot be expected. It has been found to be highly advantageous to control the crystal grain average diameter within the range of 0.05 to 0.6 mm, more preferably, within the range of 0.2 to 0.5 mm.

FIG. 1 shows the tritium emission power and the anti-swelling property, under the same condition as that of the embodiment described later, by using the metal beryllium pebbles with the grain diameter (D) regulated in the preferable range of 0.5 to 1.0 mm, and changing the crystal grain average diameter (d).

The tritium emission power becomes satisfactory if the diffusion coefficient of tritium in the metal beryllium pebble is not less than $1.0 \times 10^{-11}$ cm²/s, while the anti-swelling property is satisfactory if the swelling occurring amount is not more than 6 vol %.

As apparent from FIG. 1, when the crystal grain average diameter (d) ranges from 0.05 to 0.6 mm, the tritium emission power and the anti-swelling property were consequently satisfactory.

Diameter of crystal grain: 0.1 to 1.8 mm

In the invention, the particle diameter is restricted to range from 0.1 to 1.8 mm because when the particle diameter is less than 0.1 mm, it is difficult to ensure the crystal grain average diameter of not less than 0.05 mm, whereas when more than 1.8 mm, the packing density of the pebbles is lowered, thereby lowering the neutron multiplying power and, hence, the tritium emission power. This particle diameter preferably ranges from 0.2 to 1.5 mm.

Moreover, the particle diameter can be adjusted by controlling the rotational speed and the diameter of the consumable electrode, the arc current between both the electrodes, and the like.

Furthermore, FIG. 2 shows, with respect to the ratio D/d, the tritium emission power and the anti-swelling property obtained in the same manner as that of the case in FIG. 1, by using the metal beryllium pebbles with the particle diameter (D) ranging from 0.1 to 1.5 mm, and with the crystal grain average diameter (d) ranging from 0.05 to 0.6 mm.

D/d: 0.3 to 0.8

FIG. 2 shows, with respect to the ratio D/d, the findings of the tritium emission power and the anti-swelling property obtained in the same manner as that of the case in FIG. 1, by using the metal beryllium pebbles with the particle diameter (D) ranging from 0.1 to 1.5 mm, and with the crystal grain average diameter (d) ranging from 0.05 to 0.6 mm.

As shown in FIG. 2, if the ratio D/d ranges from 0.3 to 0.8, the tritium emission power and the anti-swelling property were particularly excellent.

Next, a more concrete production conditions for obtaining the above-mentioned preferable metal beryllium pebbles will be described below.

The inventors found as the result of the investigations that the gas pressure of the atmosphere, the arc current and the rotational peripheral velocity of the consumable electrode are particularly important in the rotational electrode process in order to control the crystal grain average diameter and the particle diameter of the metal beryllium pebble, and that an appropriate adjustment of these parameters enables the crystal grain average diameter and the particle diameter to be controlled.

That is, the followings have been clarified for the first time. (1) Raising the gas pressure in the inert gas atmosphere causes the heat absorbing ability to be improved, thereby increasing the solidifying rate of the beryllium droplets, which causes the crystal grains to be fined. (2) When the arc current between both the electrodes is controlled to an extent possible, within limits not prejudicing to the workability, and the beryllium droplets to be generated are decreased in initial temperature, it is possible to shorten the solidification finishing time, thereby causing the crystal grains to be fined. (3) When the peripheral velocity of the consumable electrode determined based on the rotational speed and the diameter thereof, the arc current between both the electrodes, and the like process conditions are controlled, it is possible to advantageously control the particle diameter.

Therefore, according to the above-mentioned recognition and findings, the inventors conducted thorough investigations in order to obtain the desired crystal grain average diameter and particle diameter. As the results indicate, the inventors advantageously solved the above-mentioned problems by controlling the gas pressure of the inert gas atmosphere to be 5300 to 11500 Torr, the arc current between both the electrodes to be 100 to 200 A, and the rotational peripheral velocity of the consumable electrode to be 4 to 100 m/s.

In this connection, the grounds for limiting the gas pressure of the inert gas atmosphere, the arc current between both the electrodes, and the rotational peripheral velocity of the consumable electrode to be within the above-mentioned range are as follows:

Gas pressure of inert gas atmosphere: 5300 to 11500 Torr

When the gas pressure is less than 5300 Torr, the crystal grains cannot be sufficiently fined, whereas when more than 11500 Torr, the rotational electrode is extremely difficult to be molten. Accordingly, the gas pressure of the inert gas atmosphere is limited to be within the range of 5300 to 11500 Torr, preferably within the range of 7600 to 11500 Torr.

Arc current: 100 to 200 A

When the arc current is less than 100 A, the rotational electrode is difficult to be molten, whereas when more than 200 A, the temperature of the beryllium solvent is so high that the crystal grains are insufficiently fined. Accordingly, the arc current between both the electrodes is limited to be within the range of 100 to 200 A, more preferably, within the range of 100 to 150 A.

Rotational peripheral velocity of consumable electrode: 4 to 1000 m/s

When the rotational peripheral velocity is less than 4 m/s, coarse grains each having a satisfactory shape are difficult to be produced, whereas when more than 1000 m/s, fine grains each having a satisfactory shape are difficult to be produced. Accordingly, the rotational periphery velocity is limited to be within the range of 4 to 1000 m/s.

Moreover, these parameters in the conventional rotational electrode process are usually set as the gas pressure of the inert atmosphere: 760 to 2300 Torr, the arc current between both electrodes: 150 to 250 A, and the rotational periphery velocity: 4 to 100 m/s. The crystal grain average diameter obtained under such conditions is approximately 0.6 to 0.8 mm, and the particle diameter approximately 0.1 to 1.8 mm.

Moreover, the inventors found out, based on their investigations, that when Fe is included into the pebble in large amounts, thereby causing helium atoms to be collected with the iron-based inclusions ($Be_{11}Fe$ and the like) as the starting points, which causes occurrence of the swelling to be accelerated because the iron-based inclusions effectively act as crystalline nuclei when the metal beryllium pebbles are produced, the crystal grains can be effectively fined.

Further investigations have been carried out to find an allowable amount of Fe from the view point of the anti-swelling property, and it has been revealed that if the Fe contents are less than 0.04 wt %, occurrence of the swelling can be effectively controlled.

On the other hand, the investigation revealed, from the view point of fining of the crystal grains, that Fe is required to be included at least 0.01 wt %.

In other words, it has been found that when the Fe contents are controlled to be within the range of 0.01 to 0.04 wt %, the fining of the crystal grain can be effectively accelerated without promoting occurrence of the swelling. Thus, the conditions of obtaining the crystal grain average diameter and the particle diameter which fall within the above-mentioned predetermined ranges, respectively, can be enlarged to the ranges given as the gas pressure of inert atmosphere: 2300 to 11500 Torr, and the arc current of both the electrodes: 100 to 250 A.

There production conditions are highly important in industrial production of the metal beryllium pebbles.

BRIEF DESCRIPTION OF THE DRAWINGS

FIG. 1 is a graph showing the influence of the crystal grain average diameter (d) of a metal beryllium pebble to the tritium emission power and the anti-swelling property.

FIG. 2 is a graph showing the relationship between the ratio d/D of the crystal grain average diameter (d) to the particle diameter (D), and the tritium emission power and the anti-swelling property.

BEST MODE FOR CARRYING OUT THE INVENTION

Figure 3:
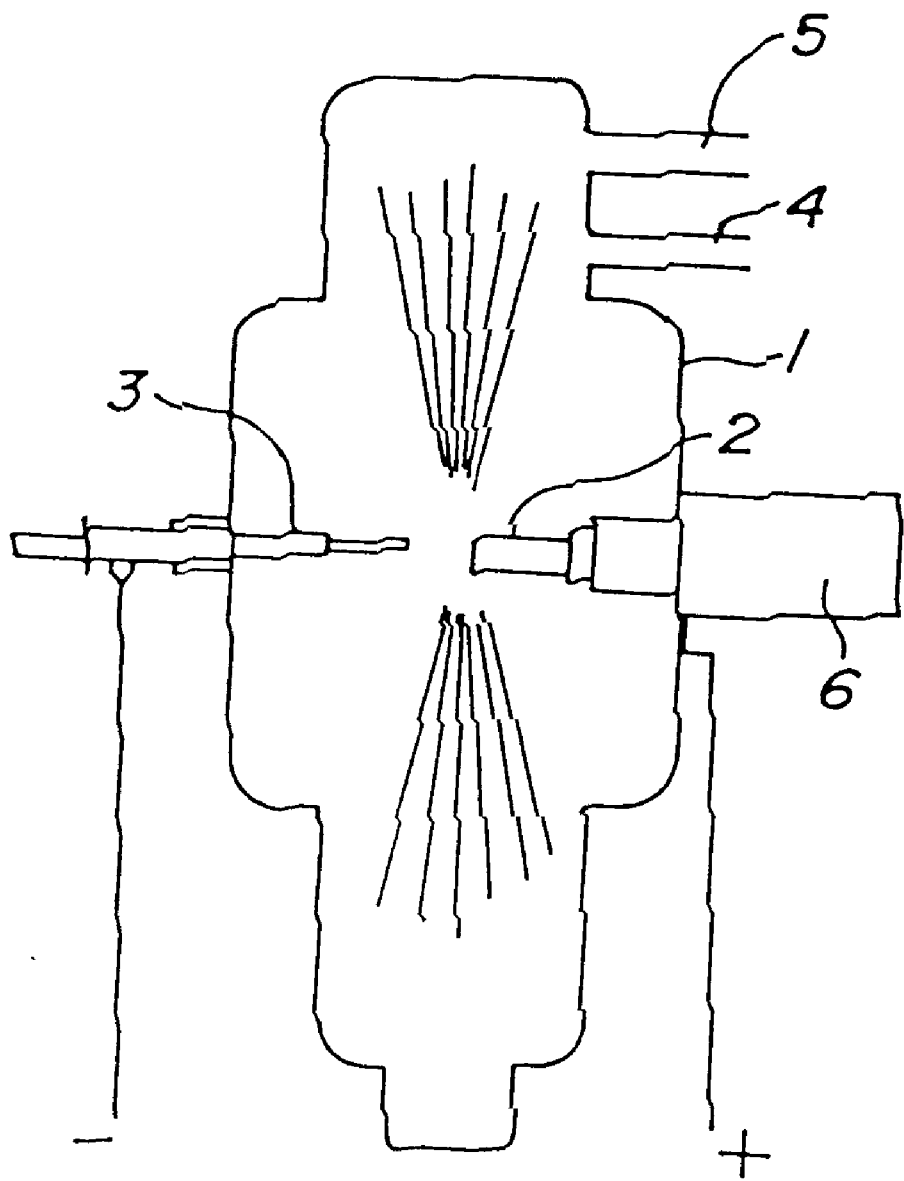
FIG. 3 is a schematic diagram of a preferable rotational electrode device which can be preferably used for producing the metal beryllium pebbles.

There is schematically shown in FIG. 3 a rotational electrode device which has been used for producing metal beryllium pebbles. In FIG. 3, reference numeral 1 designates a closed container, 2 a cylindrical consumable electrode made of metal beryllium, 3 an arc dissoluble electrode or a plasma dissoluble electrode made of water-cooled tungsten, 4 a hole for introducing an inert gas such as helium, argon, or the like, 5 an exhaust gas hole of the inert gas, and 6 a rotation-driving device of the cylindrical consumable electrode.

The consumable electrode is made of metal beryllium having Fe contents of 0.08 wt %.

In the device shown in FIG. 3, the inert gas is filled in the closed container 1, and the arc or plasma is then generated between the arc dissoluble electrode or the plasma dissoluble electrode and the cylindrical consumable electrode made of metal beryllium, thereby causing a leading end of the consumable electrode to be molten, while causing metal beryllium droplets to be splashed due to the centrifugal force created by the rotation of the consumable electrode to cause the splashed droplets to be rapidly solidified, which results in the production of pebble-like metal beryllium.

On this occasion, as described above, the current value between both the electrodes is controlled a thereby causing the temperature of the beryllium droplets molten at the leading end of the consumable electrode to be just above the melting point and, further, the pressure of the inert gas atmosphere is increased thereby improving the heat absorbing power. This increases the solidifying rate of the beryllium droplets, thereby decreasing the particle diameter of the metal beryllium pebble.

Embodiment 1

The meal beryllium pebbles were produced by the use of the above-mentioned rotational electrode device under the following condition:

Gas pressure of atmosphere: 9600 Torr

Arc current: 150 A

Rotational peripheral velocity of consumable electrode: 6.0 m/s

In the metal beryllium pebbles obtained by the invention (inventive example), the particle diameter was 1.0 mm, the crystal grain average diameter 0.4 mm, and Fe contents 0.075%.

Also, for the sake of comparison, a customary condition shown below:

Gas pressure of atmosphere: 800 Torr

Arc current: 200 A

Rotational peripheral velocity of consumable electrode: 6.0 m/s

According to the metal beryllium pebbles produced under the customary condition (comparative example) the particle diameter was 1.0 mm, the crystal grain average diameter 0.7 mm, and Fe contents 0.075%.

Thus obtained two kinds of metal beryllium pebbles were respectively subjected to a neutron irradiation at the same time (an amount of rapid neutron irradiation: about $1 \times 10^{20}$ n/cm², irradiation temperature: 200° C.), and to a tritium heating and emitting test (heating temperature: 600° C.).

Next, the diffusion coefficient of tritium in the metal beryllium pebble based on the obtained tritium emission amount was calculated. It has been thus found that the diffusion coefficient of tritium according to the invention was $2.0 \times 10^{-11}$ cm²/s, whereas the one according to the comparative example was $0.7 \times 10^{-11}$ cm²/s.

This reveals that the diffusion emission of tritium in the metal beryllium considerably depend upon the quantity of the crystal grain boundary, and that the metal beryllium pebbles each having a large quantity of crystal grain boundary, according to the invention, were more excellent in tritium emission power.

Next, the two kinds of the metal beryllium pebbles were subjected to a neutron irradiation under the same condition, and then subjected to the heat treatment at 800° C. and one hour in the argon atmosphere and further to the evaluation of the swelling.

As a result, the swelling of the metal beryllium was 2 to 4 vol % for both the inventive example, and 1 to 2 vol % for the comparative example, with the satisfactory results for the both. Incidentally, the swelling of the metal beryllium obtained by the use of the conventional magnesium reducing method was 8 to 12 vol %.

Embodiment 2

Next, the metal beryllium pebbles are produced by using the beryllium consumable electrode having Fe contents of 0.03 wt % under the following conditions:

Gas pressure of atmosphere: 3800 Torr

Arc current: 200 A

Rotational peripheral velocity of consumable electrode: 6.0 m/s

The obtained metal beryllium pebbles (Inventive Example) each was 1.0 mm in particle diameter, 0.5 mm in crystal grain average diameter, and 0.03 wt % in Fe contents.

The diffusion coefficient in thus obtained metal beryllium pebble was $1.8 \times 10^{-11}$ cm²/s, with satisfactory tritium emission power.

Also, the anti-swelling property was 0 to 2 vol %, with satisfactory results.

Moreover, it is recommended to use the metal beryllium of high purity which is produced by the use of the vacuum melting-vacuum casting method, as the consumable electrode in order to obtain the metal beryllium pebbles each having less Fe contents.

Embodiment 3

The metal beryllium pebbles are produced by using the beryllium consumable electrode having Fe contents of 0.03 wt % under the following conditions, as is the case with the Embodiment 2:

Gas pressure of atmosphere: 11500 Torr

Arc current: 150 A

Rotational peripheral velocity of consumable electrode: 6.0 m/s

The obtained metal beryllium pebbles (Inventive Example) each was 1.0 mm in particle diameter, 0.5 mm in crystal grain average diameter, and 0.03 wt % in Fe contents.

The diffusion coefficient in thus obtained metal beryllium pebble was $2.3 \times 10^{-4}$ cm$^2$/s, with satisfactory tritium emission power.

Also, the anti-swelling property was 0 to 2 vol %, with satisfactory results.

The crash strength for the metal beryllium pebbles according to the invention having the particle diameter of 1.0 mm and the crystal grain average diameter of 0.4 mm, was measured to be 11 to 15 kgf, whereas the crash strength having the particle diameter of 1.0 mm and having the crystal grain average diameter of 0.4 mm was 7 to 12 kgf. This shows that the metal beryllium pebbles according to the invention were more excellent in crash strength than the one according to the comparative example.

Moreover, the swelling occurring due to the neutron irradiation lowers the thermal conductivity. Therefore, the inventors measured the thermal conductivity for the samples of neutron-irradiated metal beryllium exhibiting the swelling, in order to grasp the degree of degradation of the thermal conductivity due to the swelling.

The hot pressed metal beryllium having the crystal grain average diameter of about 0.01 mm was used as the sample. There is shown in Table 1 the result of measurement of the thermal conductivity at the temperatures of the room temperature, 400° C. and 600° C. for the metal beryllium samples which were already subjected to the neutron irradiation of 100% T.D., which did not undergo the swelling, of 80% and 60% T.D., which underwent the swelling.

TABLE 1

| Density | Temperature | | |
|---|---|---|---|
| | Room Temperature | 400° C. | 600° C. |
| | | (Unit: W/cm/K) | |
| 100% T.D. | 1.7 | 1.0 | 0.9 |
| 80% T.D. | 1.2 | 0.7 | 0.6 |
| 60% T.D. | 0.7 | 0.5 | 0.4 |

The above results apparently indicate that the thermal conductivity of the beryllium which was already subjected to the neutron irradiation remarkably lowers due to the swelling, and sufficiently indicates that it is important to control the swelling for the metal beryllium pebbles which are used as the neutron multiplying material.

INDUSTRIAL APPLICABILITY

According to the invention, the occurrence of swelling can be effectively controlled, thereby advantageously preventing deterioration of the resistance against the external stress, the thermal conductivity, and the like of the metal beryllium pebbles used as the neutron multiplying material of the nuclear fusion reactor blanket, and also improving the tritium emission power and the collecting efficiency of the tritium as the nuclear fusion reactor fuel.

Further, the metal beryllium pebbles of the invention are so excellent in crash strength and in heat transmitting property that they are useful not only for the neutron multiplying material in the nuclear fusion reactor blanket, but also for the moderator and the reflector of the neutron.

We claim:

1. A method of producing metal beryllium pebbles by making an arc between a plasma dissoluble electrode and a cylindrical column-like metal beryllium consumable electrode, both of which being disposed in a closed container filled with an inert gas as an atmosphere, while rotating said consumable electrode to thereby melt said consumable electrode and splashing droplets due to the centrifugal force, wherein the method is carried out under conditions of a gas pressure of atmosphere in said closed container: 5300 to 11500 Torr, an arc current: 100 to 200 A, and a rotational peripheral velocity of said consumable electrode: 4 to 1000 m/s, thereby providing metal beryllium pebbles ranging from 0.1 to 1.8 mm in particle diameter and 0.05 to 0.6 mm in crystal grain average diameter.

2. A method of producing metal beryllium pebbles by making an arc between a plasma dissoluble electrode and a cylindrical column-like metal beryllium consumable electrode, both of which being disposed in a closed container filled with an inert gas as an atmosphere, while rotating said consumable electrode to thereby melt said consumable electrode and splashing droplets due to the centrifugal force, wherein said metal beryllium consumable electrode has an Fe content of 0.01 to 0.04 wt %, and wherein the method is carried out under conditions of a gas pressure of atmosphere in said closed container: 2300 to 11500 Torr, an arc current: 100 to 250 A, and a rotational peripheral velocity of the consumable electrode: 4 to 1000 m/s, thereby providing metal beryllium pebbles range from 0.1 to 1.8 mm in the diameter of crystal grain 0.05 to 0.6 mm in the average diameter of crystal grains.

3. A method of producing metal beryllium pebbles according to claim 1, wherein said particle diameter of said metal beryllium pebbles is represented by D (mm), and said crystal grain average diameter by d (mm), and wherein the relationship $0.3\,D \leq d \leq 0.8\,D$ is satisfied.

* * * * *